United States Patent [19]

Schweiger

[11] Patent Number: 5,671,927
[45] Date of Patent: Sep. 30, 1997

[54] GASKET ASSEMBLY WITH SEALING MEMBER HAVING MAIN BODY WITH INTEGRAL TABS

[75] Inventor: David J. Schweiger, Downers Grove, Ill.

[73] Assignee: Dana Corporation, Toledo, Ohio

[21] Appl. No.: 419,071

[22] Filed: Apr. 7, 1995

[51] Int. Cl.[6] .................................................. F16J 15/12
[52] U.S. Cl. ............................................. 277/9; 277/235 B
[58] Field of Search ................................ 277/9, 11, 180, 277/235 A, 235 B

[56] References Cited

U.S. PATENT DOCUMENTS

| | | |
|---|---|---|
| 1,917,214 | 7/1933 | Bailey . |
| 2,192,739 | 3/1940 | Goetze . |
| 2,200,212 | 5/1940 | Bohmer, Jr. et al. . |
| 2,339,478 | 1/1944 | Hoheisel . |
| 2,339,479 | 1/1944 | McCreary . |
| 2,681,241 | 6/1954 | Aukers . |
| 2,795,444 | 6/1957 | Nenzell . |
| 3,079,681 | 3/1963 | Fentiman . |
| 3,177,915 | 4/1965 | LaFleur et al. . |
| 3,195,906 | 7/1965 | Moyers . |
| 3,215,442 | 11/1965 | Papenguth . |
| 3,231,289 | 1/1966 | Carrell . |
| 3,302,953 | 2/1967 | Glasgow . |
| 3,560,007 | 2/1971 | Ascencio . |
| 3,565,449 | 2/1971 | Ascencio et al. . |
| 3,811,689 | 5/1974 | Farnam . |
| 3,871,668 | 3/1975 | Coker et al. . |
| 3,874,675 | 4/1975 | Belter et al. . |
| 4,026,565 | 5/1977 | Jelinek . |
| 4,254,963 | 3/1981 | Skrycki . |
| 4,272,085 | 6/1981 | Fujikawa et al. . |
| 4,312,512 | 1/1982 | Conte et al. . |
| 4,331,336 | 5/1982 | Czernik et al. . |
| 4,376,539 | 3/1983 | Baldacci . |
| 4,400,000 | 8/1983 | Moerk, Jr. . |
| 4,405,138 | 9/1983 | Skrycki . |
| 4,535,996 | 8/1985 | Cardis et al. . |
| 4,535,999 | 8/1985 | Locacius . |
| 4,711,456 | 12/1987 | Udagawa . |
| 4,783,087 | 11/1988 | DeCore et al. . |
| 4,856,796 | 8/1989 | Genin . |
| 4,955,621 | 9/1990 | Skrycki . |
| 4,976,225 | 12/1990 | Stang et al. . |
| 5,004,650 | 4/1991 | Ashizawa et al. ............... 277/235 B |
| 5,011,162 | 4/1991 | Jelinek . |
| 5,044,641 | 9/1991 | Belter . |
| 5,110,630 | 5/1992 | Abe et al. ........................ 277/235 B |
| 5,145,190 | 9/1992 | Boardman . |
| 5,340,126 | 8/1994 | Antonini ......................... 277/235 B |
| 5,516,120 | 5/1996 | Damusis ............................... 277/9 |
| 5,540,452 | 7/1996 | Belter ............................... 277/235 B |

FOREIGN PATENT DOCUMENTS

| | | |
|---|---|---|
| 0041906A1 | 12/1981 | European Pat. Off. . |
| 1948681 | 9/1969 | Germany . |
| 2714776 | 4/1977 | Germany . |
| 3718569A1 | 12/1988 | Germany . |
| 3903918A1 | 8/1990 | Germany . |
| 63101577 | 10/1986 | Japan . |
| 63214572 | 2/1987 | Japan . |
| 1260236 | 1/1972 | United Kingdom . |
| 1431183 | 4/1976 | United Kingdom . |

*Primary Examiner*—Scott Cummings
*Attorney, Agent, or Firm*—Rader, Fishman & Grauer

[57] ABSTRACT

An improved gasket insert assembly for use in a gasket that is adapted to seal a high pressure fluid opening includes a gasket body with opposed upper and lower faces, and an opening defined by an inner periphery of the gasket body. A sealing member is positioned within the opening of the gasket body by means of plurality of integral tabs extending radially outwardly from an outer periphery of the sealing member. A tab pair is formed by two of the tabs being in close circumferential proximity and a plurality of tab pairs are circumferentially spaced about the outer periphery of the sealing member. The tabs of each tab pair are compressed into opposing faces of the gasket body such than an outer face of the tabs is flush with an outer face of the gasket body to transversely center the sealing member within the gasket opening. A compressible laminate is bonded to the sealing member to improve sealing.

20 Claims, 2 Drawing Sheets

GASKET ASSEMBLY WITH SEALING MEMBER HAVING MAIN BODY WITH INTEGRAL TABS

FIELD OF THE INVENTION

The present invention relates to improvements in gasket assemblies having separate sealing members associated with high pressure fluid transfer passageways, and more particularly to a sealing member with integral tabs.

BACKGROUND OF THE INVENTION

Gaskets are often used to seal mating mechanical components. One common application involves sealing between the engine block and cylinder head of an internal combustion engine. Cylinder head gaskets typically extend around cylinder bores to provide combustion seals, retaining the high temperature/high pressure gases of combustion within the cylinder bores. Simultaneously, the gaskets also seal fluid flow openings such as coolant and oil openings to prevent undesirable mixing of the fluids.

Fluids passing through the openings of a cylinder head gasket are subjected to high pressures and elevated temperatures. Therefore, localized gasket modifications are generally required to adequately seal the fluid openings. It is known to form an opening in a main gasket body of the gasket to receive a separate sealing member.

Often the separate sealing member is secured to the main gasket body using an adhesive applied between the sealing member and the main gasket body to facilitate shipping and handling prior to gasket installation. There are a number of disadvantages to using an adhesive. In particular, the gasket body and sealing member have limited cross-sectional areas. Thus, there is a relatively limited area of contact available for the adhesive. Additionally, the very nature of the gasket body, often formed from graphite having a low coefficient of friction, disfavors bonding between an adhesive and the gasket body. Yet, if an adhesive is adequately bonded to the gasket body, even limited handling often results in the flaking away of the portion of the gasket body in contact with the adhesive.

In view of such disadvantages, it is known to secure a fluid sealing member received within an opening of a gasket body using separate mechanical fasteners. The fastener is secured between the sealing member and the main gasket body adjacent the opening to be sealed. However, when using such prior art fasteners, a portion of the clamping force from the bolted connection of the mechanical components is required to secure the fastener to the gasket body. Thus, this portion of the clamping force is not available to adequately compress the sealing member and prevent fluid leakage. The existence of such fasteners typically results in high load areas which may damage the gasket assembly or mating mechanical components.

SUMMARY OF THE INVENTION

An improved gasket assembly for sealing a high pressure fluid flow opening includes a gasket body and a sealing member with integral tabs.

The gasket body has an upper face and a lower face and an outer periphery. Typically, the gasket body has a central steel core and compressible facings of conventional densities. Formed within the gasket body is a plurality of openings defined by inner peripheries. When used as a cylinder head gasket, the gasket body includes openings that serve as openings for combustion bores and bolt holes, as well as openings to receive sealing members which in turn have a high pressure fluid flow opening.

The sealing member includes a metal plate with a main body having an outer periphery and opposed upper and lower surfaces. A plurality of integral tabs extend radially outwardly from the outer periphery of the main body, each of the tabs having a radially inner root and a radially outer apex. A tab pair is formed by two of the tabs in close circumferential proximity and at least three tab pairs are circumferentially spaced about the outer periphery of the main body. A first compressible laminate is bonded to the upper surface of the metal plate main body, and a second compressible laminate is bonded to the lower surface thereof. The two laminates are cross-linked with each other through small apertures in the metal plane. Alternatively, or in combination with molding, a primer may be applied to the metal plate to provide a rough surface finish and then an adhesive disposed between the laminate and the metal plate.

One tab of each tab pair is bent about the tab root to extend generally perpendicularly away from the main body plane in a common direction. The temporary deformation provides the required clearance to permit the sealing member to be inserted into the appropriate opening of the gasket body.

To secure the sealing member to the gasket body, the tabs are compressed toward each other so that they grip the gasket body by being alternatingly recessed into its upper and lower faces. Thus, a portion of the clamping force applied to the gasket assembly is not required to secure the sealing member to the gasket body, helping to ensure a leak proof seal. Potential high load areas, which could limit the available clamping load or damage the gasket assembly, are minimized. While there is a limited gap between the outer periphery of the sealing member plate and an inner periphery of the corresponding opening in the gasket body, the tabs permit movement of the sealing member relative to the gasket body to accurately control positioning upon assembly and to adjust for mechanical or thermal conditions during gasket operation.

BRIEF DESCRIPTION OF THE DRAWINGS

The features and inventive aspects of the present invention will become more apparent upon reading the following detailed description, claims, and drawings, of which the following is a brief description:

DETAILED DESCRIPTION OF A PREFERRED EMBODIMENT

Figure 1:
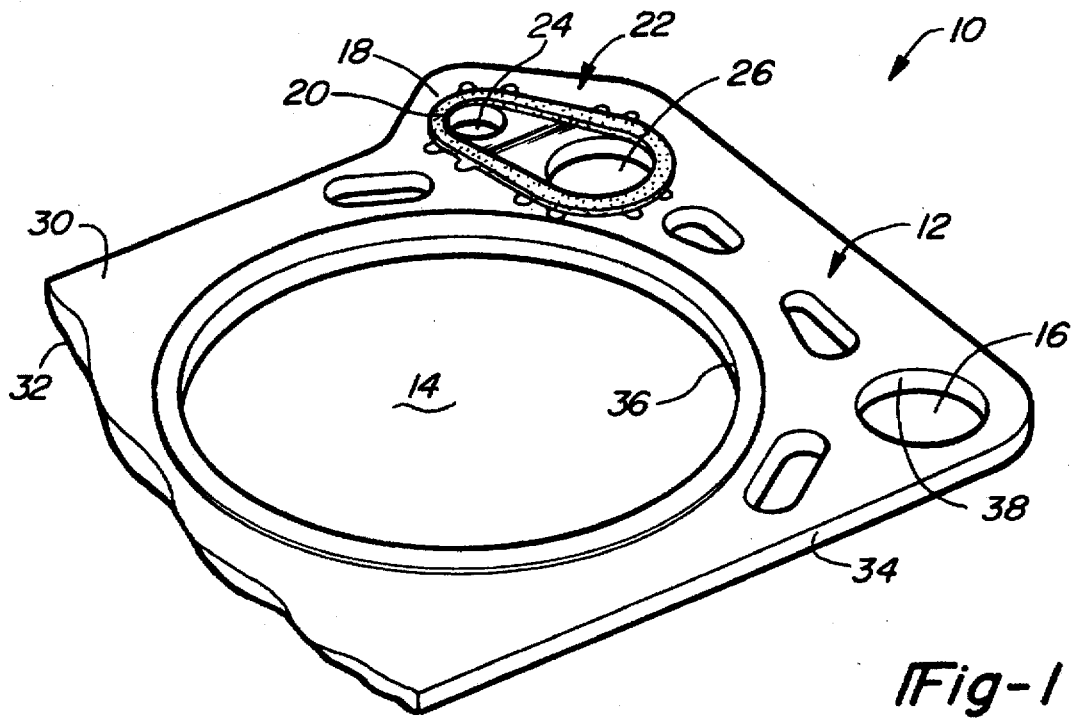
FIG. 1 is a perspective view of a portion of a gasket assembly according to a preferred embodiment of the present invention, including a gasket body and a sealing member.

A gasket assembly 10 illustrated in FIG. 1 is used to seal mating mechanical components (not shown). In a preferred embodiment, gasket assembly 10 functions as a cylinder head gasket, compressed between an engine block and cylinder head of an internal combustion engine (neither of which is shown). Gasket assembly 10 includes a gasket body 12 with a plurality of combustion bore openings 14, bolt holes 16, and an opening 18 defined by an inner periphery 20 that receives a sealing member 22. Sealing member 22 includes a high pressure fluid flow opening 24 and a bolt hole 26.

Gasket body 12 includes an upper face 30, a lower face 32, and an outer periphery 34. Typically, gasket body 12 is a composition perforated steel or stainless steel core having a compressible facing of typical densities. Formed within gasket body 18 is a plurality of openings defined by respective inner peripheries, including those that form a portion of combustion bore openings 14 and bolt holes 16. As illustrated in FIG. 1, a combustion bore opening 14 has an inner periphery 36 while a bolt hole 16 has an inner periphery 38.

Figure 2:
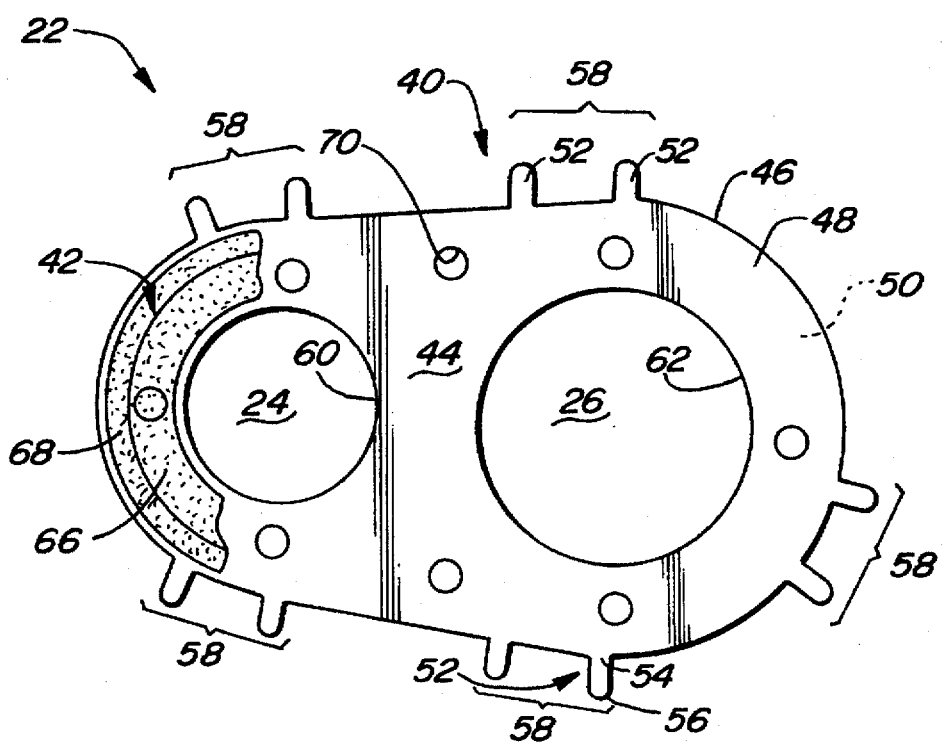
FIG. 2 is a planar view of the metal plate of the sealing member and a portion of the compressible laminate.

FIG. 2 illustrates sealing member 22 before it is secured to gasket body 12. Sealing member 22 includes a deformable metal plate 40 and a compressible laminate 42. Metal plate 40 is preferably an SAE 1010 steel. Plate 40 has a main body 44, an outer periphery 46, and as better illustrated in FIGS. 4 and 5, and opposed upper and lower surfaces 48 and 50, respectively.

A plurality of integral tabs 52 extend radially outwardly from outer periphery 46 of main body 44, each of the tabs having a radially inner root 54 and an radially outer arched apex 56. Preferably, root 54 has a greater circumferential extent than apex 56 to increase tab strength and reduce the risk of tab breakage during forming, installation, and compressing. The method of assembly is discussed in greater detail below. A tab pair 58 is formed by two of tabs 52 being in close circumferential proximity. A plurality of tab pairs 58 are circumferentially spaced about outer periphery 46 of main body 44. Preferably, there are at least three, and more preferably five, tab pairs 58. High pressure fluid flow opening 24 is defined within main body 44 by an inner periphery 60 while bolt opening 26 is defined by an inner periphery 62.

Compressible laminate 42 is bonded to main body 44 radially inwardly of outer periphery 46 and circumscribes a generally outer extent of sealing member 22. As better illustrated in FIGS. 4 and 5, laminate 42 includes a radially inner base portion 66 and an abutting radially outer integral bead 68 adjacent outer periphery 46, bead 68 having a greater transverse thickness than base portion 66. Before being compressed by the clamping force of the mating mechanical components, bead 68 typically extends transversely or axially beyond the respective upper surface 30 or lower surface 32 of gasket body 12. Thus, when gasket assembly 10 is compressed between the mating mechanical components, the thicker and readily compressible bead 68 provides an improved seal for high pressure fluid flow opening 24. So that laminate 42 may readily compress, it is formed from an elastomeric material, with silicone, fluorosilicone, viton, or nitrile being preferred.

Figure 5:
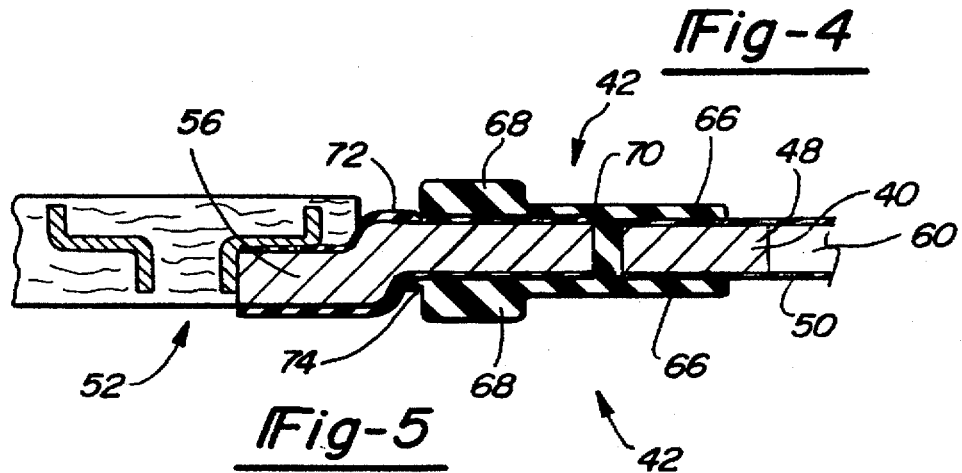
FIG. 5 is a cross-sectional view of a portion of the gasket assembly taken along lines 5—5 of FIG. 3.

In a preferred embodiment, main body 44 of metal plate 40 includes a plurality of relatively small apertures 70 positioned radially inwardly of outer periphery 46. As shown in FIG. 5, a first laminate 42 is molded to upper surface 48 of plate 40 and a second laminate 42 is molded to lower surface 50 of plate 40, the first laminate being cross-linked with the second laminate by through apertures 70. Thus, bonding between laminates 42 and plate 40 is improved. Bonding may also be improved by providing plate 40 with a coarse surface finish 72. In one preferred embodiment, a primer of zinc phosphate is used as course surface finish 72. Then a high temperature fluid resistant adhesive 74 is disposed between finish 72 and laminate 42. Base portion 66 provides an increased area of contact for the adhesive, and coarse surface finish 72 allows the adhesive to bond more readily to plate 40.

Plate 40 is preferably fabricated by stamping, wherein material is removed from a blank to form main body 44 with outer periphery 46 and radially outwardly extending integral tabs 52. Openings 24, 26 and apertures 70 are created using punch dies. Laminate 42 may be bonded to opposing surfaces 48 and 50 of plate 40 using high temperature molding to permit cross-linking through apertures 70. Alternatively, or in conjunction with molding, a primer may be applied to opposing surfaces 48 and 50 to create a coarse surface finish 72, and then disposing an adhesive between finish 72 and laminate 42. Then one tab 52 of each tab pair 58 is bent about a corresponding root 54 to extend generally perpendicularly away from main body 44 in a common direction. Next, plate 40 is inserted into opening 18 of gasket body 12 such that the tabs which were bent extend through opening 18 while the unbent tabs come into contact with the face of gasket body 12 on the side from which the plate was inserted. Then the tabs are compressed toward each other so that sealing member 22 is firmly secured within opening 18.

Figure 3:
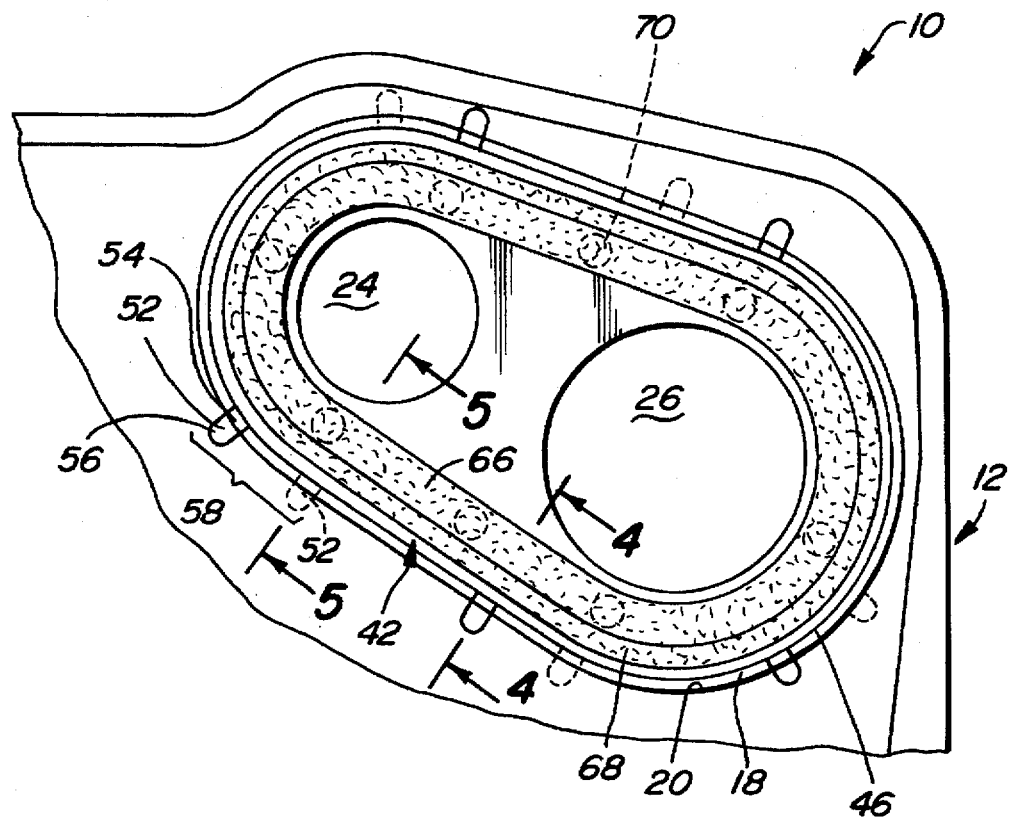
FIG. 3 is a planar view of a portion of the gasket assembly showing the sealing member secured within an opening of the gasket body.
Figure 4:
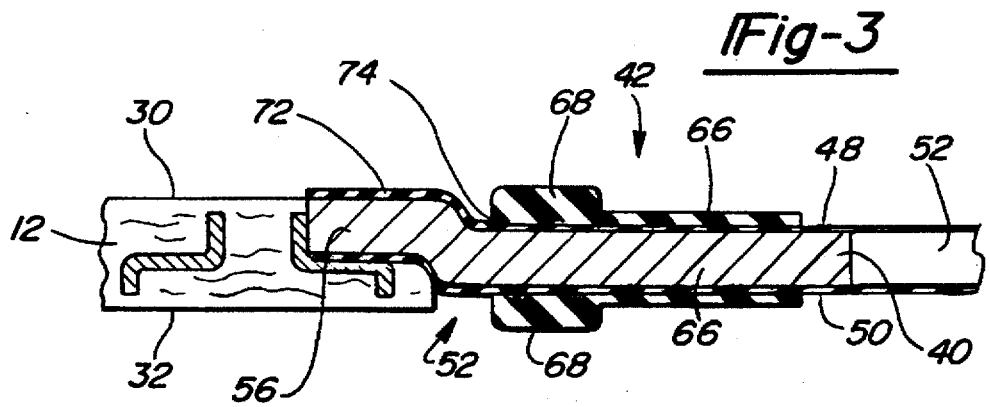
FIG. 4 is a cross-sectional view of a portion of the gasket assembly taken along lines 4—4 of FIG. 3.

As illustrated in FIGS. 3 through 5, upon compression of tabs 52, each tab 52 of a tab pair 58 has a generally S-shaped cross-section such that apex 56 is transversely spaced from the plane of main body 44. To transversely center sealing member 22 within opening 18, apex 56 of each tab 52 of a tab pair 58 is preferably equally displaced from main body 44, particularly if gasket body 12 has a uniform axial thickness.

As shown in FIGS. 4 and 5, upon tab compression, tabs 52 are recessed into compressible gasket body 12 such that a outer face of the portion of tabs 52 in contact with the gasket body is generally flush with either upper face 30 or lower face 32 of gasket body 12. Thus, upon gasket loading, the mating mechanical components make direct contact with gasket body 12 and laminate 42 of sealing member 22 rather than resting on top of tabs 52. Otherwise, sealing may be compromised. Further, by having tabs 52 recessed into gasket body 12, a portion of the clamping force from the bolted connection of the mechanical components is not required to secure sealing member 22 to gasket body 12. Thus, this portion of the clamping force is available to ensure a leak proof seal.

Sealing is also improved by having tabs 52 alternatingly contact either upper surface 30 or lower surface 32 of gasket body 12. Potential high load areas which could limit the available clamping load to gasket body 12 and sealing element 22, damage gasket assembly 10, or even ruin the mating mechanical components (e.g., through brinelling) are minimized. Finally, alternating tabs 52 permit the same sealing member to be used for different gasket thicknesses, while still permitting the transverse centering of sealing member 22 within opening 18. Transverse centering is very important to ensure an adequate fluid seal between sealing member 22 and gasket body 12.

In the illustrated embodiment, both a high pressure fluid flow opening 24 and a bolt hole 26 are shown. Having a bolt hole associated with sealing member 22 is often desirable to provide maximum clamping force to the sealing member and the adjacent portion of gasket body 12. However, having both a fluid flow opening 24 and a bolt hole 26 in a fluid sealing member could promote alignment difficulties during assembly. While there is a limited gap between outer periphery 46 of plate 40 and inner periphery 20 of gasket body 12, the use of tabs 52 permits the advantageous adjustment of sealing member 22 relative to gasket body 12 to accurately control bolt and fluid flow opening positioning upon assembly and to adjust for mechanical or thermal conditions during gasket operation.

Tabs 52 eliminate press fitting of sealing body 22 to gasket body 12 which can promote misalignment, tool wear, handling difficulties, and compromise long term attachment between the two components. Tabs 52 also obviate the need for an adhesive applied between sealing member 22 and gasket body 12, wherein there is a relatively limited area of contact available for the adhesive and typically a low coefficient of friction, particularly on the gasket body.

Preferred embodiments of the present invention have been described. It is to be understood that variations and modifications may be employed without departing from the scope of the present invention. Accordingly, the following claims should be studied to learn the true scope of the present invention.

What is claimed is:

1. A sealing member adapted to seal a high pressure fluid opening comprising:

a metal plate, said plate having a main body with an outer periphery and further including opposed upper and lower surfaces, a high pressure fluid flow opening defined by said main body, a plurality of integral tabs extending radially outwardly from said outer periphery of said main body, each of said tabs having a radially inner root and a radially outer apex, a tab pair formed by two of said tabs in close circumferential proximity, a plurality of tab pairs circumferentially spaced about said outer periphery of said main body, a first tab and a second tab of each said tab pair having a generally S-shaped cross-section such that said apex is transversely spaced from the plane of said main body, said first tab and said second tab extending in opposite transverse directions, said first tab and said second tab adapted to engage a gasket body on opposite sides of said gasket body; and a compressible laminate bonded to said main body of said metal plate adjacent said outer periphery, said laminate including a bead adjacent said outer periphery of said main body.

2. A sealing member as recited in claim 1, wherein said first tab and second tab apexes are substantially equally transversely spaced from said main body.

3. A sealing member as recited in claim 2, wherein said main body further defines a plurality of apertures positioned radially inwardly of said outer periphery, a first laminate bonded to said upper surface and a second laminate bonded to said lower surface, said first laminate cross-linked with said second laminate through said apertures.

4. A sealing member as recited in claim 2, wherein said plate has a coarse surface finish to promote bonding of said compressible laminate to said plate.

5. A sealing member as recited in claim 4, wherein said coarse surface finish comprises a primer applied to said plate.

6. A sealing member as recited in claim 5, wherein an adhesive is disposed between said primer and said laminate to promote bonding.

7. A sealing member adapted to seal a high pressure fluid opening comprising:

a metal plate, said plate having a main body with an outer periphery and further including opposed upper and lower surfaces, a high pressure fluid flow defined by said main body, a plurality of integral tabs extending radially outwardly from said outer periphery of said main body, each of said tabs having a radially inner root and a radially outer apex, a tab pair formed by two of said tabs in close circumferential proximity, at least three tab pairs circumferentially spaced about said outer periphery of said main body, a first tab of each said tab pair having a generally S-shaped cross-section such that said apex is transversely spaced from the plane of said main body, a second tab of each said tab pair having an equal, but oppositely directed S-shaped cross-section such that said apex of said first tab and said apex of said second tab are equally transversely spaced from the plane of said main body, said first tab and said second tab adapted to engage a gasket body on opposite sides of said gasket body, said main body further defining a plurality of apertures positioned radially inwardly of said outer periphery; and a compressible laminate molded to said main body of said metal plate radially inwardly of said outer periphery, said laminate including a base portion and an abutting integral bead, said bead having a greater axial extent than said base portion, said bead adjacent said outer periphery of said main body, a first laminate molded to said upper surface and a second laminate bonded to said lower surface, said first laminate cross-linked with said second laminate through said apertures.

8. A sealing member as recited in claim 7, wherein said plate has a coarse surface finish and an adhesive disposed between said compressible laminate and said coarse surface finish to promote bonding between said compressible laminate and said plate.

9. A sealing member as recited in claim 7, wherein said root of each of said tabs has a first circumferential extent and said apex of each of said tabs has a second circumferential extent, said first circumferential extent being greater than said second circumferential extent.

10. A gasket assembly adapted to seal a high pressure fluid opening comprising:

a gasket body with opposed upper and lower faces and an inner periphery defining an opening that extends through a portion of said gasket body; and a sealing member received within said opening of said gasket, said sealing member including a metal plate, said plate having a main body with an outer periphery and further including opposed upper and lower surfaces, a high pressure fluid flow opening defined by said main body, a plurality of integral tabs extending radially outwardly from said outer periphery of said main body, each of said tabs having a radially inner root and a radially outer apex, a tab pair formed by two of said tabs in close circumferential proximity, a plurality of tab pairs circumferentially spaced about said outer periphery of said main body, an outer face of said apex of a first tab of each said tab pair generally flush with said upper face of said gasket body and an outer face of said apex of a second tab of each said tab pair generally flush with said lower face of said gasket body, and a compressible laminate bonded to said main body of said metal plate adjacent said outer periphery, said laminate including a bead adjacent said outer periphery of said main body.

11. A gasket assembly as recited in claim 10, wherein said plate is centered within said opening of said gasket body between said upper face and said lower face.

12. A gasket assembly as recited in claim 11, wherein said first tab of each said tab pair has a generally S-shaped cross-section such that said apex is transversely spaced from said main body, said second tab of each said tab pair having an equal, but oppositely directed S-shaped cross-section such that said apex of said first tab and said apex of said second tab are equally transversely spaced from said main body.

13. A gasket assembly as recited in claim 12, wherein said gasket is formed from a compressible material such that said tabs compress said material.

14. A gasket assembly as recited in claim 13, wherein said root of each of said tabs has a first circumferential extent and said apex of each of said tabs has a second circumferential extent, said first circumferential extent being greater than said second circumferential extent.

15. A gasket assembly as recited in claim 13, wherein said main body of said metal plate further defines a plurality of apertures positioned radially inwardly of said outer periphery, a first laminate bonded to said upper surface and a second laminate bonded to said lower surface, said first laminate cross-linked with said second laminate through said apertures.

16. A sealing member as recited in claim 13, wherein a primer is applied to said face to provide a coarse surface finish with an adhesive disposed between said primer and said laminate to promote bonding.

17. A sealing member adapted to seal a high pressure fluid opening comprising:

a metal plate, said plate having a main body with an outer periphery and further including opposed upper and lower surfaces, a high pressure fluid flow opening defined by said main body, a plurality of integral tabs extending radially outwardly from said outer periphery of said main body, each of said tabs having a radially inner root and a radially outer apex, said root of each of said tabs having a first circumferential extent and said apex of each of said tabs having a second circumferential extent, said first circumferential extent being greater than said second circumferential extent, a tab pair formed by two of said tabs in close circumferential proximity, a plurality of said tab pairs circumferentially spaced about said outer periphery of said main body, a first tab and a second tab of each said tab pair having a generally S-shaped cross-section such that said apex is transversely spaced from the plane of said main body, said first tab and said second tab extending in opposite transverse directions; and a compressible laminate bonded to said main body of said metal plate adjacent said outer periphery, said laminate including a bead adjacent said outer periphery of said main body.

18. A sealing member as recited in claim 17, wherein said first tab and second tab apexes are substantially equally transversely spaced from said main body.

19. A sealing member as recited in claim 18, wherein said main body further defines a plurality of apertures positioned radially inwardly of said outer periphery, a first laminate bonded to said upper surface and a second laminate bonded to said lower surface, said first laminate cross-linked with said second laminate through said aperture.

20. A sealing member as recited in claim 18, wherein said plate has a coarse surface finish to promote bonding of said compressible laminate to said plate.

\* \* \* \* \*

UNITED STATES PATENT AND TRADEMARK OFFICE
CERTIFICATE OF CORRECTION

PATENT NO : 5,671,927
DATED : September 30, 1997
INVENTOR(S) : David J. Schweiger It is certified that error appears in the above-identified patent and that said Letters Patent is hereby corrected as shown below:

Col. 3, line 66
 replace "course"
 with --coarse--.

Signed and Sealed this

Twenty-first Day of April, 1998

Attest:

BRUCE LEHMAN

*Attesting Officer*            *Commissioner of Patents and Trademarks*